(12) United States Patent
Brown

(10) Patent No.: US 10,021,077 B1
(45) Date of Patent: Jul. 10, 2018

(54) SYSTEM AND METHOD FOR DISTRIBUTING AND USING SIGNED SEND TOKENS

(71) Applicant: Google LLC, Mountain View, CA (US)

(72) Inventor: Glenn Christopher Brown, Gilroy, CA (US)

(73) Assignee: Google LLC, Mountain View, CA (US)

( * ) Notice: Subject to any disclaimer, the term of this patent is extended or adjusted under 35 U.S.C. 154(b) by 342 days.

(21) Appl. No.: 14/275,178

(22) Filed: May 12, 2014

(51) Int. Cl.
*H04L 29/06* (2006.01)
*H04L 9/32* (2006.01)
*H04L 9/08* (2006.01)

(52) U.S. Cl.
CPC ........ *H04L 63/0471* (2013.01); *H04L 9/0861* (2013.01); *H04L 9/3247* (2013.01)

(58) Field of Classification Search
CPC .... H04L 63/047; H04L 9/0861; H04L 9/3247
USPC .......................................................... 713/153
See application file for complete search history.

(56) References Cited

U.S. PATENT DOCUMENTS

| | | | | |
|---|---|---|---|---|
| 6,240,514 B1* | 5/2001 | Inoue | ................. | H04L 63/0464 380/248 |
| 7,685,206 B1* | 3/2010 | Mathew | ................ | H04L 63/105 707/785 |
| 8,370,630 B2* | 2/2013 | Ogawa | ................... | H04L 51/00 380/255 |
| 8,392,712 B1* | 3/2013 | Wilson | ................... | H04L 63/08 713/175 |
| 9,264,413 B2* | 2/2016 | Zhang | ..................... | H04L 63/08 |
| 2003/0204721 A1* | 10/2003 | Barrus | .................... | H04L 51/38 713/153 |
| 2005/0102522 A1* | 5/2005 | Kanda | ................. | H04L 63/0823 713/176 |
| 2007/0110438 A1* | 5/2007 | Su | ....................... | H04J 14/0204 398/45 |
| 2007/0201447 A1* | 8/2007 | Wright | ............... | H04L 63/0807 370/356 |
| 2008/0052520 A1* | 2/2008 | Lee | ....................... | H04L 9/3247 713/176 |
| 2009/0271847 A1* | 10/2009 | Karjala | .............. | H04L 63/0807 726/6 |
| 2010/0011431 A1* | 1/2010 | Cynkin | .............. | G06F 21/6218 726/9 |
| 2011/0231840 A1* | 9/2011 | Burch | ................ | G06F 9/45533 718/1 |
| 2012/0110337 A1* | 5/2012 | Murphey | ................ | G06F 21/10 713/182 |
| 2013/0117550 A1* | 5/2013 | Jevans | .................. | G06F 21/572 713/2 |

(Continued)

*Primary Examiner* — Farid Homayounmehr
*Assistant Examiner* — Thanh T Le
(74) *Attorney, Agent, or Firm* — Lerner, David, Littenberg, Krumholz & Mentlik, LLP

(57) ABSTRACT

The disclosed system allows a user to have access to a protected network through the distribution of signed send tokens. In particular, a device associated with the protected network, such as a network interface card, may generate and issue send tokens to various third-parties who seek access to the network. A send token may be a block of data that contains transmission information regarding the operations that are allowed to be performed by the network user. For example, the send token may identify the portions of the network to which the user's data packets are allowed to be sent, as well as the permitted content of the user's data packets.

19 Claims, 4 Drawing Sheets

(56) References Cited

U.S. PATENT DOCUMENTS

| | | | | |
|---|---|---|---|---|
| 2014/0123266 | A1* | 5/2014 | Carbou | H04L 61/2567 726/13 |
| 2014/0130145 | A1* | 5/2014 | Yeleswarapu | H04L 61/30 726/9 |
| 2014/0150080 | A1* | 5/2014 | Miller | G06F 21/10 726/9 |
| 2014/0282990 | A1* | 9/2014 | Engelhart | H04L 63/08 726/9 |
| 2014/0331303 | A1* | 11/2014 | Park | H04W 12/06 726/10 |
| 2015/0043335 | A1* | 2/2015 | Testicioglu | H04L 45/48 370/230 |
| 2015/0281254 | A1* | 10/2015 | Sharma | H04L 63/0876 726/4 |
| 2016/0105286 | A1* | 4/2016 | Li | H04L 9/14 380/286 |

* cited by examiner

SYSTEM AND METHOD FOR DISTRIBUTING AND USING SIGNED SEND TOKENS

BACKGROUND OF THE INVENTION

Various networks for computing devices provide access to information or features. Some of these networks allow untrusted computing devices, including virtual machines, to access the network, however these networks may also require protection from unauthorized access to prevent malicious activities from being performed on the network.

BRIEF SUMMARY OF THE INVENTION

Aspects of the disclosure provide a computer implemented method for distributing and using signed send tokens. The method may include receiving a data packet and a signed send token, wherein the data packet includes payload data to be transmitted over a protected network. The method may further include decrypting the signed send token, authenticating a signature of the signed send token, and identifying transmission information contained in the send token. An augmented data packet may then be generated that includes at least a portion of the transmission information and the payload data.

In one example, the method may include determining whether the signed send token has expired and determining whether the received signed send token was transmitted by an authorized entity.

In another example, the signed send token may include an encryption key for encrypting and authenticating the augmented data packet. The method may further include identifying encryption information contained in the send token and generating an encryption key for encrypting and authenticating the augmented data packet, wherein the encryption key is based on the encryption information contained in the send token.

In yet another example, the transmission information may include at least one of an encapsulation header, TCP header field value, and IP header field. In addition, the step of generating an augmented data packet may include adding a new encapsulation header to the data packet. The step of receiving a data packet and send token may also include receiving a plurality of data packets and one or more send tokens.

Another computer implemented method in accordance with the disclosure includes receiving a request for one or more send tokens, and determining, whether the request has been made by an entity that is entitled to the requested send tokens If the entity is determined to be entitled to the requested send tokens, the security parameters to be included in the send token may be determined. One or more send tokens may then be generated, wherein the one or more requested send tokens include the determined security parameters. The send token may be encrypted, signed, and transmitted in response to the received request. The determined security parameters may be an encapsulation header, TCP header field, IP header field, an encryption key, and identification of permitted payload data.

The method may further include assigning an expiration date to the send token. In addition, generating the send token may include providing identification information of one or more entities that are authorized to use the send token. At least a portion of the security parameters may be incorporated into a data packet so as to create an augmented data packet.

DETAILED DESCRIPTION

Overview

The disclosed system allows a user to have access to a protected network through the distribution of signed send tokens. In particular, a device associated with the network, such as a network interface card, may generate and issue send tokens to various third-parties who seek access to the network. A send token may be a block of data that contains transmission information regarding the operations that are allowed to be performed by the network user. For example, the send token may identify the portions of the network to which the user's data packets are allowed to be sent, as well as the permitted content of the user's data packets. In addition, the transmission information contained in the send token may include encapsulation headers, TCP header field values, and identification of permitted Internet protocol (IP) headers and payloads.

In generating the send tokens, the network interface may encrypt and sign each send token using a secret key. The network interface may then grant network rights to the user by transmitting a certain number of signed send tokens to the user. Given that the network user does not have access to the network interface's secret key, the network user will be unable to access the contents of the send token. The network user will also be unable to alter the contents of the send token without invalidating the send token's signature. The network user may store the send tokens and then transmit send tokens to the network interface when seeking access to the network.

In one example, the network user may be an untrusted virtual machine seeking to perform operations that require the transmission of data to a specific portion of the network. Before the data is allowed to be transmitted within the network, the network interface may require that the virtual machine provide one or more signed send tokens. If the tokens indicate that the virtual machine has been granted rights to perform the desired operations, then the data may be transmitted to the designated portion of the network.

The rights granted by the send token may be limited in any number of ways. For example, the tokens may include an expiration date by which they must be used. In addition, the send tokens may restrict the network user's ability to transfer the send tokens to other users by including verification information regarding the identity of the network user.

Allowing signed send tokens to be stored at unsecure locations simplifies storage, facilitating scaling. Any sensitive information contained within the signed send tokens may be stored at otherwise unsecure locations, given that each send token is encrypted and signed by the network interface. In this way, use of the signed send tokens may prevent unauthorized access to the network by untrusted users in a manner that is easily scalable to large networks.

Example Systems

Figure 1:
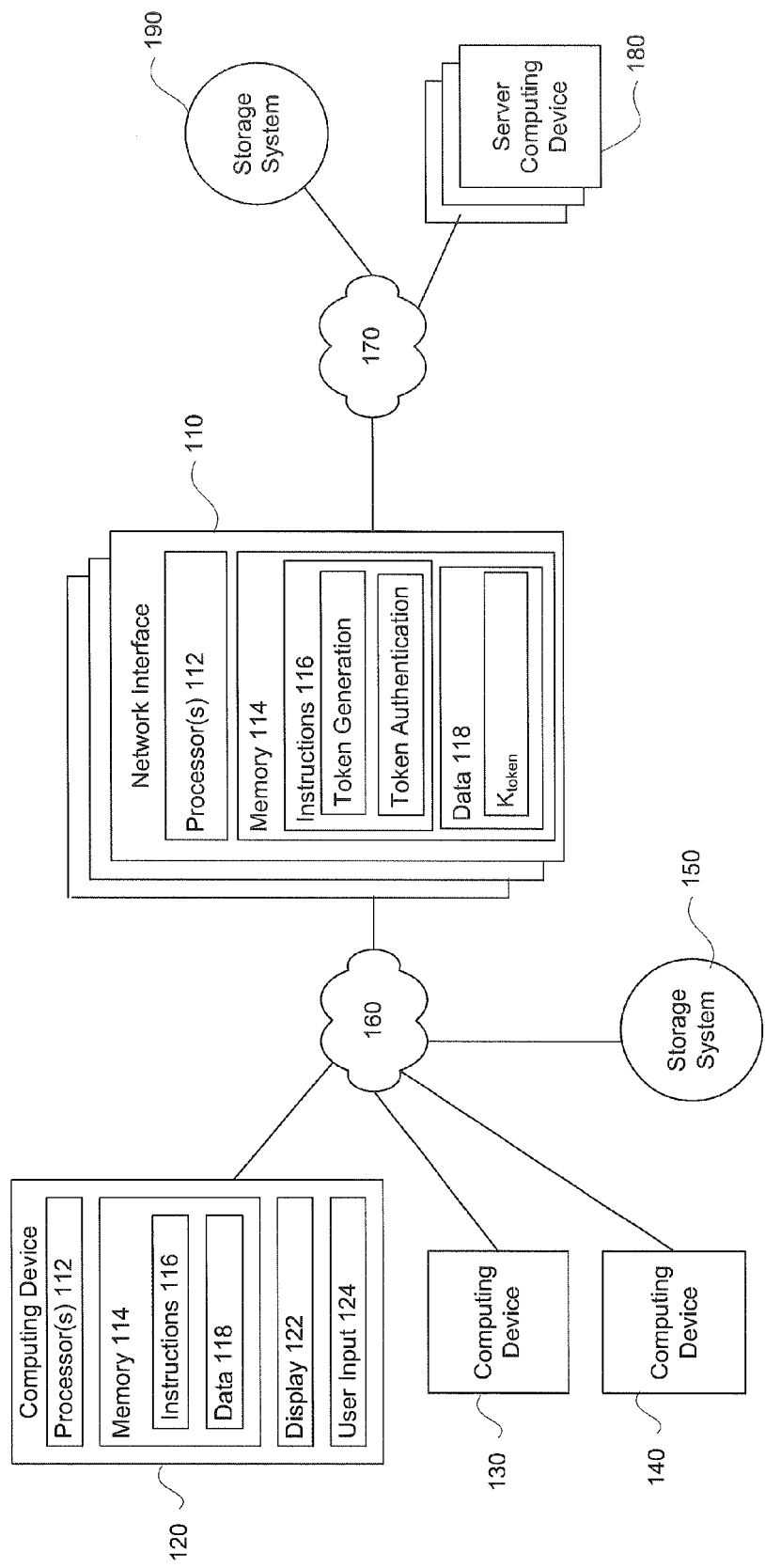
FIG. 1 is an example of a system that may be used in accordance with aspects of the disclosure.

FIG. 1 depicts an example system 100 in which the features described above may be implemented. This example should not be considered as limiting the scope of the disclosure or usefulness of the features described herein. In this example, system 100 includes network interfaces 110, computing devices 120, 130, and 140, server computing devices 190, as well as storage systems 150 and 190. Network interfaces 110 may contain one or more processors 112, memory 114 and may be incorporated with other components typically present in general purpose computing devices. Memory 114 of network interface 110 store information accessible by processor 112, including instructions 116 that can be executed by the processor 112.

Memory also includes data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

The computing devices 110 can be at various nodes of a network 160 and capable of directly and indirectly communicating with other nodes of network 160. Although only a few computing devices are depicted in FIG. 1, it should be appreciated that a typical system can include a large number of connected computing devices, with each different computing device being at a different node of the network 160. In addition, each link shown in FIG. 1 may represent one or more network links.

The network 160 and intervening nodes described herein can be interconnected using various protocols and systems, such that the network can be part of the Internet, World Wide Web, specific intranets, wide area networks, or local networks. The network can utilize standard communications protocols, such as Ethernet, Wi-Fi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may include one or more web servers that are capable of communicating with storage system 150 as well as computing devices 120, 130, and 140 via the network. For example, server computing devices 110 may use network 160 to transmit and present information to a user, such as user 220, 250, or 250, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 125 (e.g., a mouse, keyboard, touch-screen or microphone). The client computing device may also include a camera for recording video streams, speakers, a network interface device, and all of the components used for connecting these elements to one another. In addition, computing devices 120-140 may include virtual machines that are running on or under the control of the computing devices 120-140.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

As with memory 114, storage system 150 can be of any type of computerized storage capable of storing information accessible by server computing device 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to or incorporated into any of the computing devices 110-140 (not shown).

Network 170 may be a protected network that is not accessible to computing devices 120-140 without the grant of network privileges. Access to network 170 may include any transmission of data on network 170, including the ability to transmit packets of data to one or more of the devices located on network 170, such as servers 180 and storage system 190. In accordance with one aspect, network interface 110 may provide computing devices 120-140, including virtual machines running on computing devices 120-140, with access to network 170 by granting network privileges through the transmission of send tokens. The send token may take any form that allows it to be used as described herein. In one aspect, a send token may be seen as a block of data or metadata that includes information regarding the various operations that may be performed on network 170.

Figure 2:
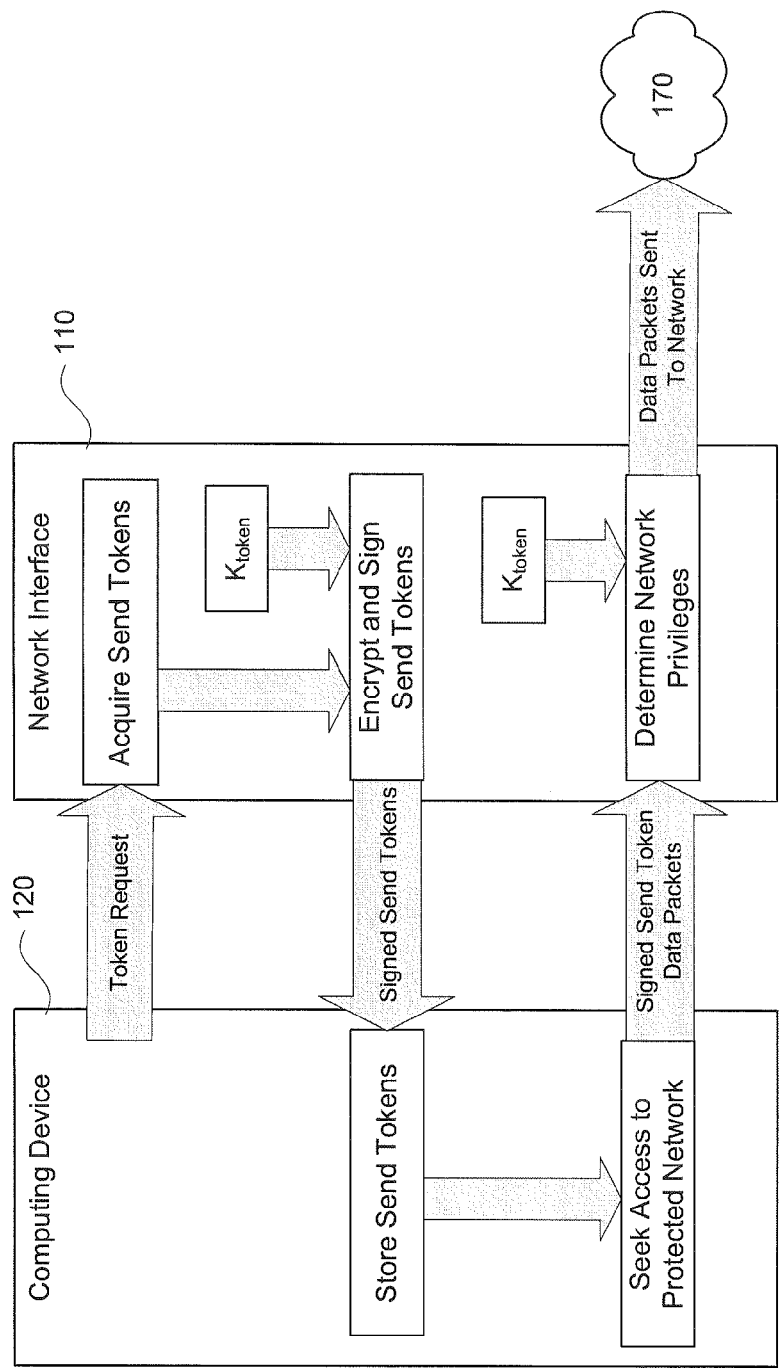
FIG. 2 is a diagram of devices that may be used in connection with the example system.

In order to receive send tokens, computing devices 120-140 may transmit a request to network interface 110. FIG. 2 shows an example of send tokens being transmitted from network interface 110 to computing device 120 and then being used by computing device 120 to access a secure network. As shown in FIG. 2, network interface 110 receives a request from computing device 120 for one or more send tokens. As will be described in more detail below, the network interface may then determine if the computing device 120 is entitled to receive the requested send tokens. Once this determination is made, the network interface 120 may generate or otherwise acquire the send tokens that correspond to the request. The send tokens are encrypted and signed by the Network Interface's key, $K_{token}$. The send tokens may then be transmitted to and stored by computing device 120. Computing device 120, or a virtual machine running on computing device 120, may then seek access to protected network 170 by transmitting one or more send tokens to network interface 110. In particular, computing device 120 may transmit send tokens along with a set of data packets that are to be transmitted within network 170. As will be described in further detail below, network interface 110 may decrypt and verify the authenticity of the send tokens transmitted from computing device 120. Once the send tokens are verified, network interface may then transmit the data packets to network 170, or perform other operations specified by the send token, in accordance with the access granted by the send tokens. The network interface may prevent data packets from being transmitted within protected network 170 if they are not accompanied by a valid send token.

In one aspect of the disclosure, the send tokens may include some or all of the information needed for data to be transmitted to a portion of network 170. In one example, the data to be transmitted from computing device 120 to network 170 may need to be encrypted and authenticated by network interface 110 using a transmission key. This transmission key may be incorporated into the send token. In this example, computing device 120 may transmit a send token to network interface 110, as well as data packets that are to be transmitted over network 170. Upon receiving the send token and data packets, network interface 110 may access the transmission key contained in the send token and use the transmission key to decrypt and authenticate at least a portion of the data packet.

In another example, the send token may include data that is used by network interface 110 to generate a transmission key. The transmission key may in turn be used by network interface 110 to encrypt and authenticate the data packets to be transmitted. The send token may also include encapsulation headers to be used in transmitting the data packet over network 170, TCP header field values, and identification of permitted IP payloads.

FIG. 2 provides an example in which the same network interface 110 provides the signed send tokens to computing device 120 as well as receives the signed send tokens from computing device 120. However, this is not required, as different network interfaces 110, or other computing devices, may be used in sending and receiving signed send tokens. For example, a first network interface 110 may be used to generate, encrypt, and transmit the signed send tokens, while a second network interface 110 may later receive and decrypt the signed send tokens in connection with a request to transmit data within network 170.

Figure 3:
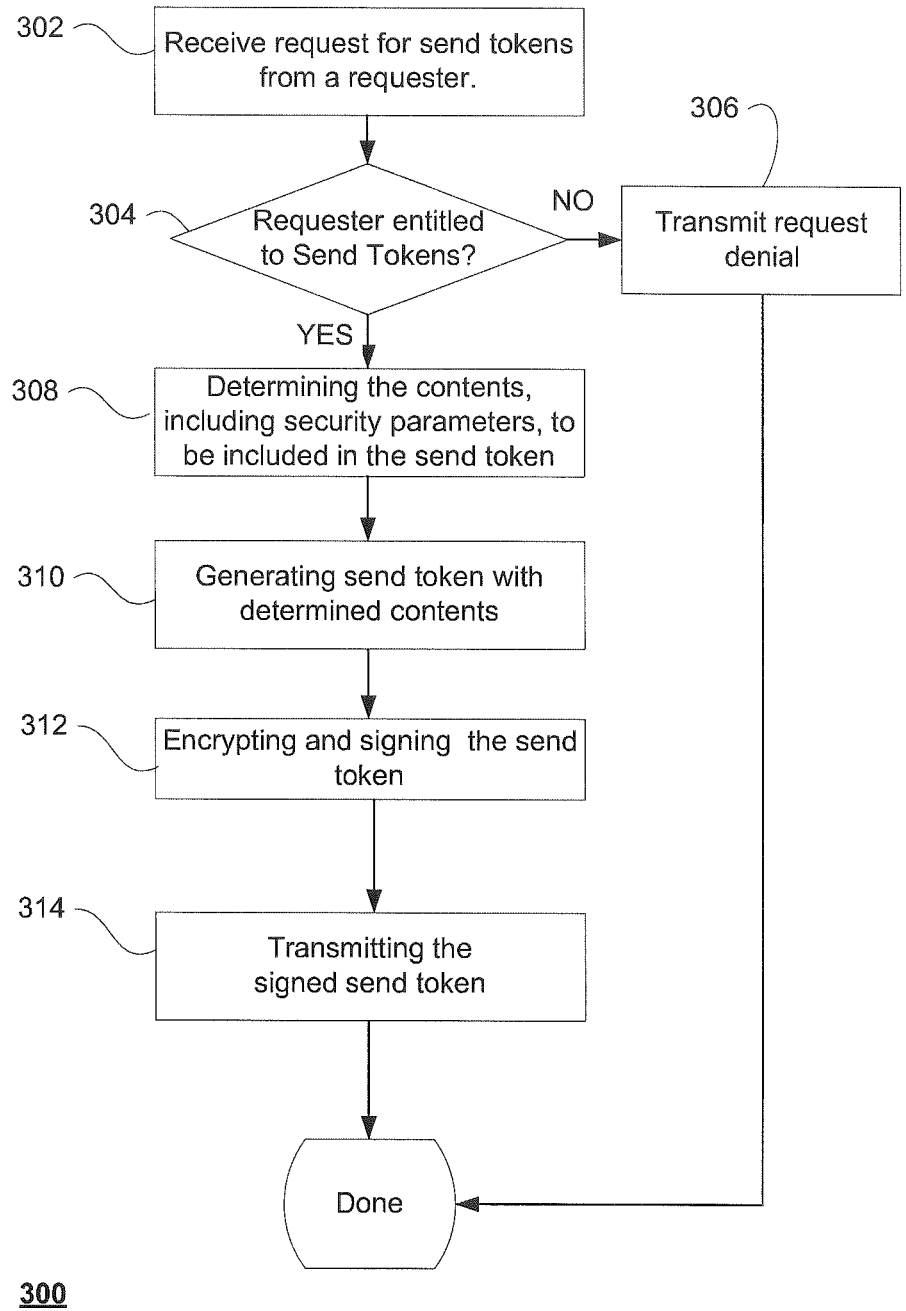
FIG. 3 is a flow diagram describing an example of a method that may be used to generate send tokens in accordance with aspects of the disclosure.

FIG. 3 shows flow diagram 300, which sets forth operations that may be performed by a network interface in connection with providing send tokens to a computing device. As seen in Block 302, network interface receives a request for one or more send tokens. The request may include information regarding the specific operations that the requesting computing device wishes to perform on the protected network. For example, the request may seek send tokens that will allow for the transmission of data to a particular server or group of servers on the protected network. In another example, the request may seek send tokens that will allow for particular operations to be performed by the requester on the protected network.

An audit may be performed to determine whether the requester may receive the requested send tokens (Block 304). This audit may be performed by the network interface communicating with other computing devices. For example, network interface 110 shown in FIG. 1 may communicate with one of the servers 180. In particular, server 180 may store an audit list of computing devices that are entitled to send tokens. The audit list may designate how many send tokens a particular computing device may be issued, as well as how many send tokens have been issued and are still held by the computing device. In addition, the audit list may designate specific types of send tokens that may be transmitted to a particular computing device, such as by designating the particular network operations that may be performed by the computing device. Network interface 110 may transmit information to server 180 that identifies the computing device that is making the request, as well as identifying the number and type of send tokens that are being requested. Server 180 may then determine whether the requesting computing device is entitled to the requested send tokens by comparing the request with the audit list.

Returning to FIG. 3, if it is determined that the requester is not entitled to the requested send tokens, a transmission may be made to the requester indicating that the request has been denied (Block 306). If the audit finds that the requester is entitled to the requested send tokens, a determination may be made as to the contents of the send token (Block 308). The contents of the send token are determined, at least in part, on the security parameters required for the data to be transmitted. As set forth above, the send token may include information regarding a transmission key that can be used to encrypt the data packets before they are transmitted within the protected network. In addition, the determination may include identification of encapsulation headers, TCP header field values, and the permitted inner-IP that will be used to transmit the data packet within the protected network.

One or more send tokens may then be generated which include the necessary contents for authenticating and transmitting a data packet (Block 310). In accordance with one aspect, the send token may include a key, $K_{data}$, that may be used to encrypt data packets that are to be transmitted over the network. In addition, rather including the actual key, $K_{data}$, send token may instead include information that may be used by the network interface to generate $K_{data}$. The send token may also include information that will be used to direct the data packet within the protected network. For example, the send token may include GRE headers that network interface may use in directing a data packet within the protected network. In another example, the IP header fields may be included within the send token.

Once the send token has been generated, it may also be encrypted and signed so as to create a signed send token (Block 312). For example, the network interface may use a self-signing key, $K_{token}$, to both encrypt and sign the send token. While $K_{token}$ may implement an asymmetric cipher, a less expensive symmetric cipher, such as AES-GCM, may also be used. In another example, the encryption and signing of the send token may occur separately, using an encryption algorithm that is distinct from the algorithm used to sign the send token. The signed send token may then be transmitted to the requestor (Block 314).

Upon receiving the signed send tokens, the requestor may store them for later use. For example, as described above in connection with FIG. 2, computing device 120 may store the signed send tokens received from network interface 110. The signed send tokens may be stored locally on the computing device or on a remote storage system. Computing device 120 may then seek access to protected network 170 by transmitting to a network interface both the signed send tokens and the data packets to be transmitted over protected network 170. Since the send token received by computing device 120 is encrypted and signed by network interface 110, computing device 120 will be unable to access the information contained within the send token. In particular, computing device 120 will not be able to read the security parameters, such as the transmission key and encapsulation headers, contained within the signed send token.

The network privileges that are granted by a send token may be specifically defined or may be limited in one or more ways. In one aspect, the send token may be limited to a particular time period in which the send token must be used. For example, the send token may include an expiration date after which the send token will no longer be valid. In another aspect, the send token may be limited in the degree to which it may be transferred to other computing devices. For example, use of the send token may be restricted so that it may only be used by the particular computing device 120 that originally received the send token from network interface 110. This may be achieved by including information within the send token that identifies the particular computing device or devices for which the network privileges are being granted. In yet another aspect, the send token may include information that identifies the operations that may be performed within the protected network. For example, the send token may identify a specific portion of the protected network to which data may be transmitted.

Figure 4:
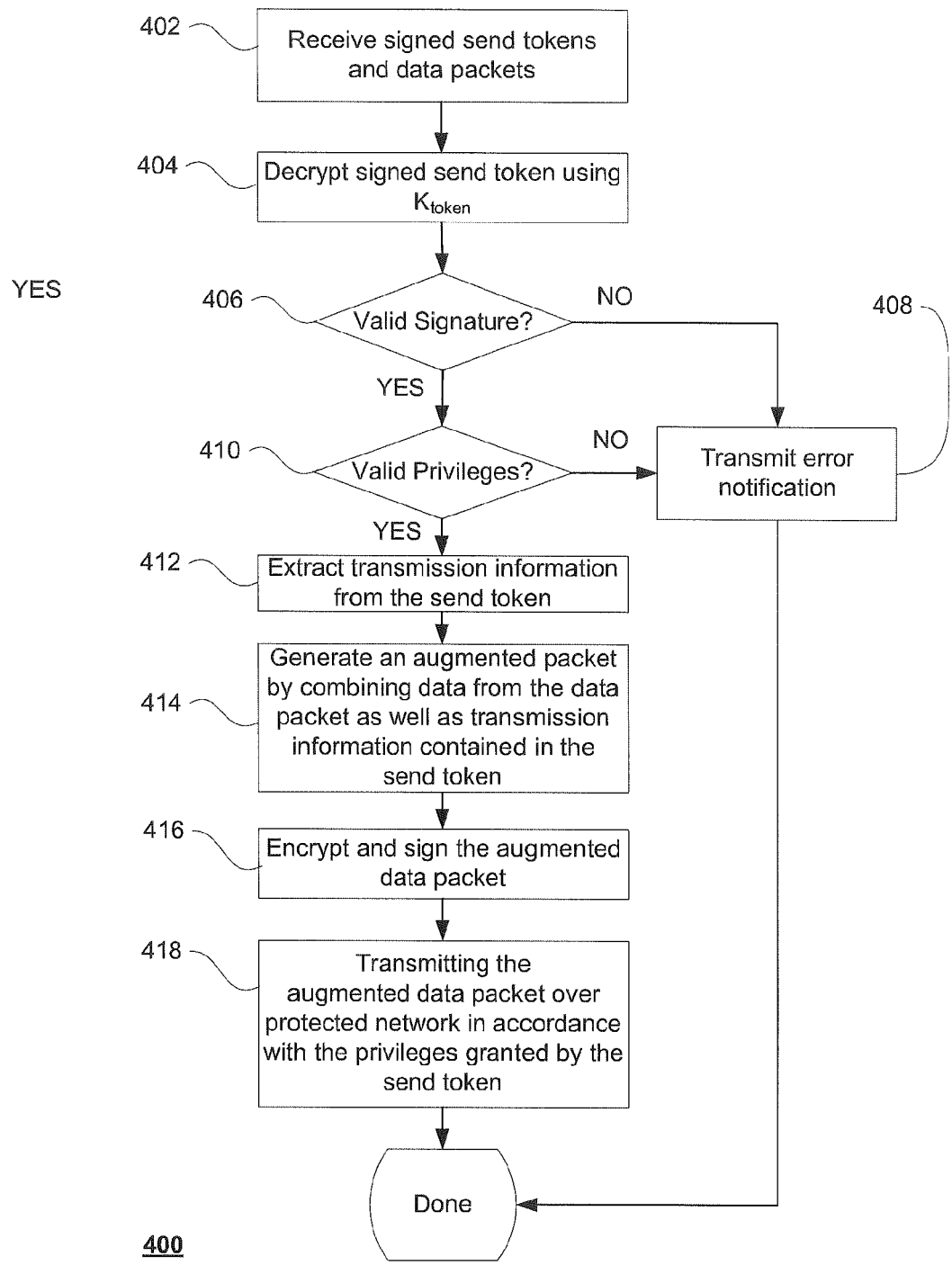
FIG. 4 is a flow diagram describing an example of a method that may be used to use send tokens in accordance with aspects of the disclosure.

FIG. 4 shows flow diagram 400 of operations that may be performed by a network interface in providing a computing device with access to a protected network. In Block 402, the network interface receives one or more signed send tokens as well as data packets that contain data to be transmitted over the protected network. The network interface may decrypt signed send token using the key, $K_{token}$ (Block 404). In Block 406, the network interface determines if the signature of the signed send token is valid (Block 406). In particular, it may be determined whether the send token has an authentic signature and whether the send token has been altered since it was originally signed. If the send token's signature is not authentic, or if the send token has been altered since it was originally signed, the application of $K_{token}$ to the altered send token will produce an invalid result. In this instance, the network interface may transmit a notification indicating that the transmitted send token was invalid and that the requested data transmission will not be performed (Block 406).

A determination may also be made as to whether the send token grants valid network privileges (Block 408). As described above, the send token may contain information that limits the network privileges being granted by the send token. For example, the network interface may determine if the send token has an expiration date and whether it has expired. The network interface may also determine whether the send token is being provided by a computing device that is not authorized to use the send token. If the send token does not grant valid privileges, such as by being expired or being transmitted by an unauthorized computing device, the network interface may transmit an error notification indicating that the requested operation will not be performed (Block 408).

If the send token is determined to have a valid signature and valid network privileges, the network interface may then extract transmission information from the decrypted send token (Block 412). As stated above, the transmission information may include encapsulation headers, TCP header field values, and identification of permitted IP payloads. A portion of the transmission information extracted from the send token may be combined with data from the data packet so as to create an augmented data packet (Block 414). For example, the augmented data packet may include the encapsulation headers contained in the send token as well as the payload data of the original data packet. The augmented data packet may also be encrypted and authenticated using information contained in the send token, such as by using the key $K_{data}$ described above (Block 416). The augmented data packet may then be transmitted over the protected network in accordance with the privileges granted by the send token (Block 418).

The operations shown in FIGS. 3 and 4 need not be performed in the precise order described above. Rather, various operations can be handled in a different order or simultaneously. Operations may also be added or omitted. In addition, while the operations of FIGS. 3 and 4 are described as being performed by a network interface, the operations may be performed by other computing devices that are in communication with a network interface. In one example, the communications described in FIG. 3 between the requester and the network interface may be established using a trusted daemon as an intermediate so as to provide for a secure transmission of send tokens.

By using signed send tokens to transmit data over a protected network, the disclosed system allows untrusted guests to be in possession of the security parameters needed to access the protected network without compromising the integrity of those security parameters. In addition, aspects of the disclosed system allow a network interface to support a large number of send tokens without requiring the network interface to store large amounts of data related to various security parameters. For example, encapsulation headers, TCP header field values, and encryption keys, such as $K_{data}$ may all be accessed within the signed send token and need not be permanently stored at the network interface. In this way, the disclosed system is scalable to large networks without requiring the scaling of certain network resources, such as network interface storage.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method comprising:
encrypting and signing, by one or more computing devices interfacing with a protected network, a signed send token using a secret key, wherein the signed send token includes information defining network privileges granted to a virtual machine and includes transmission information permitted for a data packet to be transmitted over the protected network;
transmitting the signed send token to the virtual machine;
receiving, by the one or more computing devices from the virtual machine, a data packet, wherein the data packet includes payload data to be transmitted over the protected network;
receiving, by the one or more computing devices, the signed send token from the virtual machine;
decrypting, by the one or more computing devices, the signed send token using the secret key;
authenticating, by the one or more computing devices, a signature of the signed send token;
extracting, by the one or more computing devices, the transmission information contained in the send token;
generating, by the one or more computing devices, an augmented data packet, wherein the augmented data packet includes at least a portion of the extracted transmission information and the payload data; and
transmitting, by the one or more computing devices, the augmented data packet over the protected network.

2. The method of claim 1, further comprising determining, by the one or more computing devices, whether the signed send token has expired.

3. The method of claim 1, further comprising determining, by the one or more computing devices, whether the received signed send token was transmitted by an authorized entity.

4. The method of claim 1, wherein the signed send token includes an encryption key for one of encrypting and authenticating the augmented data packet.

5. The method of claim 1, further comprising:
identifying, by the one or more computing devices, encryption information contained in the send token;
generating, by the one or more computing devices, an encryption key for encrypting and authenticating the augmented data packet, wherein the encryption key is based on the encryption information contained in the send token.

6. The method of claim 1, wherein the transmission information comprises at least one of an encapsulation header, TCP header field value, and IP header field.

7. The method of claim 1, wherein the step of generating an augmented data packet comprises adding a new encapsulation header to the data packet.

8. The method of claim 1, wherein the step of receiving comprises receiving a plurality of data packets and one or more send tokens.

9. A system comprising one or more processors, the one or more processors being configured to:
encrypt and sign a signed send token using a secret key, wherein the signed send token includes information defining network privileges granted to a virtual machine and includes transmission information permitted for a data packet to be transmitted over a protected network;
transmitting the signed send token to the virtual machine;
receive the data packet from the virtual machine, wherein the data packet includes payload data to be transmitted over a protected network;
receive the signed send token from the virtual machine;
decrypt the signed send token using the secret key;
authenticate a signature of the signed send token;
extract transmission information contained in the send token;
generate an augmented data packet, wherein the augmented data packet includes at least a portion of the extracted transmission information and the payload data; and
transmit the augmented data packet over the protected network.

10. The system of claim 9, wherein the one or more processors are further configured to determine whether the signed send token has expired.

11. The system of claim 9, wherein the one or more processors are further configured to determine whether the received signed send token was transmitted by an authorized entity.

12. The system of claim 9, wherein the signed send token includes an encryption key for one of encrypting and authenticating the augmented data packet.

13. The system of claim 9, wherein the one or more processors are further configured to:
identify encryption information contained in the send token; and
generate an encryption key for one of encrypting and authenticating the augmented data packet, wherein the encryption key is based on the encryption information contained in the send token.

14. The system of claim 9, wherein the transmission information comprises at least one of a encapsulation header, IP header field, and TCP header field.

15. The system of claim 9, wherein the one or more processors are further configured to transmit the augmented data packet over the protected network in accordance with the transmission information.

16. A method comprising:
requesting, by a requestor device comprising a virtual machine, a signed send token for accessing a protected network from one or more interface devices interfacing with the protected network;
receiving, by the requestor device in response to the request, the signed send token from the interface device, the signed send token being encrypted and signed by the interface device using a secret key, wherein the signed send token includes information defining network privileges granted to the requestor device and includes transmission information permitted for a data packet to be transmitted over the protected network;

storing the signed send token;

transmitting, by the requestor device to the interface device, a data packet, wherein the data packet includes payload data to be transmitted over the protected network;

transmitting, by the requestor device to the interface device, the signed send token for decryption by the interface device using the secret key, authentication of a signature of the signed send token by the interface device, and generation of an augmented data packet using transmission information extracted from the signed send token and the payload data.

17. The method of claim 16, wherein the signed send token restricts a time period within which the requestor device is authorized to send the data packet over the protected network.

18. The method of claim 16, wherein the transmission information comprises at least one of an encapsulation header, TCP header field value, and IP header field.

19. The method of claim 16, further comprises sending a plurality of data packets, each of the plurality of data packets being augmented using the signed send token.

* * * * *